H. REICHERT.
HOG CATCHER.
APPLICATION FILED JUNE 2, 1908.
905,579.
Patented Dec. 1, 1908.
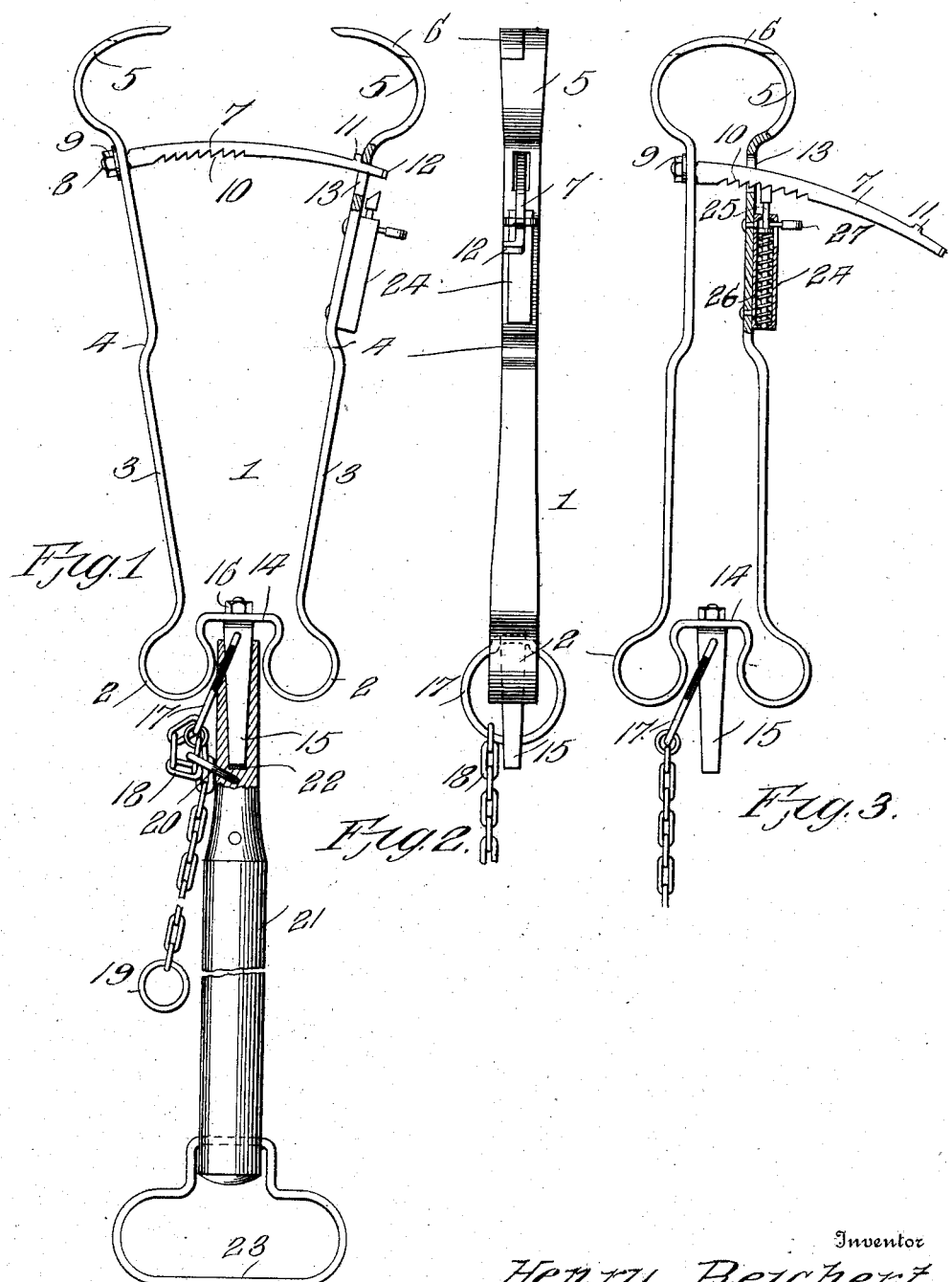
Witnesses
Frank Hough
Inventor
Henry Reichert,
By Victor J. Evans
Attorney
THE NORRIS PETERS CO., WASHINGTON, D. C.

UNITED STATES PATENT OFFICE.

HENRY REICHERT, OF ROCKDALE, TEXAS.

HOG-CATCHER.

No. 905,579.

Specification of Letters Patent.

Patented Dec. 1, 1908.

Application filed June 2, 1908. Serial No. 436,188.

*To all whom it may concern:*

Be it known that I, HENRY REICHERT, a citizen of the United States of America, residing at Rockdale, in the county of Milam and State of Texas, have invented new and useful Improvements in Hog-Catchers, of which the following is a specification.

This invention relates to hog catchers, and one of the principal objects of the same is to provide a device having a pair of spring closed jaws held open by a trigger, said trigger being in position to be actuated whenever the device is in position to grasp the leg of a hog.

Another object of the invention is to provide a spring-holding tool to be mounted in a handle said handle being detachable from the device so that the hog may be led by a chain connected to the holder.

These and other objects may be attained by means of the construction illustrated in the accompanying drawing, in which,—

Figure 1 is a side elevation and partial section of a hog catcher made in accordance with my invention the jaws of the holder being shown open and the device connected to the operating handle. Fig. 2 is an edge view of the holder with the jaws closed. Fig. 3 is a side view of the holder with the jaws closed and locked, a portion of the device being shown in section.

Referring to the drawing for a more specific description of my invention, the numeral 1 designates a holding tool for catching hogs, said tool comprising a strip of spring metal bent to form the spring lobes 2, the shanks 3 projecting from said lobes, the offset portions 4 and the jaws 5, said jaws being rabbeted, as at 6, to fit one upon the other and to form a smooth ring or holding member to grasp the leg of a hog. A trigger 7 is provided with a shank 8 which is screw threaded and is passed through one of the members of the holding device and secured in place by means of a nut 9. A series of ratchet teeth 10 are formed on one edge of the trigger 7, and a lug 11 is formed near the free end of said trigger. The end 12 of the trigger extends through an opening 13 in one of the members of the holding device, as shown more particularly in Fig. 1. The straight portion 14 of the holding device is provided with a tapering shank 15 secured thereto by means of a nut 16 the tapering portion 15 having secured thereto a ring 17 to which a chain 18 is connected, said chain 18 having a ring 19 at its free end. A ring 20 is pivotally connected to a handle 21, said handle 21 having a socket 22 in its end to accommodate the shank 15 of the holding device. A hand hold 23 is connected to the outer end of the handle.

A spring bolt is secured to the side of one of the jaws of the holding device, said spring bolt comprising a casing 24 containing a sliding bolt 25 surrounded by a spring 26 within the casing, and a finger hold 27 is connected to the sliding bolt for operating the same. The beveled end of the sliding bolt engages the ratchet teeth 10 automatically when the jaws are brought together by their own resiliency.

The operation of my invention may be briefly described as follows: The jaws 5 are separated and held apart by the lug 11 on the trigger 7, said lug bearing on the inner side of one of the jaw members and the end of the trigger extending through the slot 13. The handle 21, which may be of considerable length, is used for securing the holding tool upon the leg of the animal. When the trigger 7 is brought into contact with the leg the lug 11 is released from the jaw member, and the trigger 7 passes through the slot 13, and the sliding bolt then engages the teeth 10 to hold the jaws 5 locked together. The handle 21 is then removed from the holding tool, and the chain 18 is used for leading or driving the animal.

My invention is of simple construction, operates quickly and efficiently for its purpose, can be manufactured at slight cost and cannot readily get out of order.

Having thus described the invention, what is claimed as new, is:—

1. The hog catching tool comprising a body portion made of a single piece of resilient metal provided with co-acting jaws at one end, one of said jaws having a slot therein, a trigger carried by the other jaw and provided with ratchet teeth, said trigger extending through said slot and provided with means for holding said jaws open, and a sliding bolt for locking said jaws closed.

2. A catching and holding tool comprising a resilient body portion consisting of two jaw members, one of which is provided with a slot, a trigger secured to one of said members and extending through said slot in the other member, said trigger having ratchet teeth formed thereon and having means adapted to hold the jaws open against the stress of said resilient jaw members, a sliding bolt for engaging said ratchet teeth, and a detachable handle for said tool.

In testimony whereof I affix my signature in presence of two witnesses.

HENRY REICHERT.

Witnesses:
D. L. WILSON,
J. L. LOCKETT, Jr.